(12) United States Patent
Wan et al.

(10) Patent No.: US 12,545,303 B2
(45) Date of Patent: Feb. 10, 2026

(54) VEHICLE PARKING CONTROL METHOD AND APPARATUS

(71) Applicant: BYD COMPANY LIMITED, Guangdong (CN)

(72) Inventors: Qiang Wan, Shenzhen (CN); Lu Wang, Shenzhen (CN); Zhicheng Tan, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 186 days.

(21) Appl. No.: 18/372,364

(22) Filed: Sep. 25, 2023

(65) Prior Publication Data

US 2024/0010248 A1 Jan. 11, 2024

Related U.S. Application Data

(63) Continuation of application No. PCT/CN2022/080170, filed on Mar. 10, 2022.

(30) Foreign Application Priority Data

Apr. 19, 2021 (CN) .......................... 202110420320.2

(51) Int. Cl.
*B61L 17/02* (2006.01)
*B61C 17/00* (2006.01)
*B61L 17/00* (2006.01)

(52) U.S. Cl.
CPC ............. *B61L 17/02* (2013.01); *B61C 17/00* (2013.01)

(58) Field of Classification Search
CPC .. B61L 17/02; B61L 15/0058; B61L 15/0062; B61L 2201/00; B61C 17/00;
(Continued)

(56) References Cited

U.S. PATENT DOCUMENTS 4,578,754 A * 3/1986 Sahasrabudhe ..... B61L 15/0062
246/182 B
6,459,980 B1 * 10/2002 Tabata .................... B60L 50/16
180/65.245
(Continued)

FOREIGN PATENT DOCUMENTS

CN 102632913 A 8/2012
CN 107878448 A 4/2018
(Continued)

OTHER PUBLICATIONS

International Search Report and Written Opinion for Application No. PCT/CN2022/080170, mailed on Jun. 15, 2022, 9 pages.
(Continued)

*Primary Examiner* — Logan M Kraft
*Assistant Examiner* — John D Bailey
(74) *Attorney, Agent, or Firm* — Sheppard Mullin Richter & Hampton LLP

(57) ABSTRACT

A method for controlling vehicle parking, includes: obtaining, by a processor, a current vehicle speed and a current vehicle control level of a vehicle; obtaining, by the processor, a target vehicle speed of the vehicle, and obtaining a target vehicle control level of the vehicle according to the current vehicle control level; obtaining, by the processor, a first vehicle control level according to the current vehicle speed, the target vehicle speed, the current vehicle control level, and the target vehicle control level; and controlling, by the processor, the vehicle to run according to the first vehicle control level.

20 Claims, 2 Drawing Sheets

(58) Field of Classification Search
CPC ... B61C 17/12; B60W 30/06; B60W 50/0205; B60W 60/0015; B60W 2710/20; B60W 2720/106; B60W 2520/10; B60W 2520/14
USPC .......................................................... 701/20
See application file for complete search history.

(56) References Cited

U.S. PATENT DOCUMENTS

| | | | | |
|---|---|---|---|---|
| 6,719,076 | B1* | 4/2004 | Tabata | B60L 50/61 903/910 |
| 7,660,659 | B2* | 2/2010 | Watanabe | B62D 15/0275 701/96 |
| 9,269,271 | B2* | 2/2016 | Chong | B60T 7/22 |
| 11,180,136 | B2* | 11/2021 | Sadakiyo | B60W 30/06 |
| 11,192,550 | B2* | 12/2021 | Lindhuber | B60W 50/14 |
| 2002/0041239 | A1* | 4/2002 | Shimizu | B62D 15/0275 340/932.2 |
| 2002/0054159 | A1* | 5/2002 | Obradovich | B60R 16/0231 715/839 |
| 2003/0154014 | A1* | 8/2003 | Iwata | B60W 10/184 123/352 |
| 2004/0113489 | A1* | 6/2004 | Iwagawa | B60T 7/107 303/155 |
| 2005/0264099 | A1* | 12/2005 | Kamiya | B60T 7/22 303/15 |
| 2005/0270177 | A1* | 12/2005 | Mori | B60T 7/12 340/932.2 |
| 2006/0149455 | A1* | 7/2006 | Sawada | B60T 7/22 701/96 |
| 2007/0027598 | A1* | 2/2007 | Mori | B60W 10/184 701/41 |
| 2007/0132563 | A1* | 6/2007 | Balbale | G08G 1/168 340/932.2 |
| 2008/0009990 | A1* | 1/2008 | Katoh | B62D 15/0285 340/436 |
| 2008/0086253 | A1* | 4/2008 | Nakayama | B60T 7/122 701/80 |
| 2009/0091475 | A1* | 4/2009 | Watanabe | G08G 1/168 701/41 |
| 2009/0132143 | A1* | 5/2009 | Kamiya | B60T 7/22 701/96 |
| 2009/0178876 | A1* | 7/2009 | Miki | B62D 9/00 701/41 |
| 2010/0106372 | A1* | 4/2010 | Watanabe | B62D 15/0285 701/41 |
| 2011/0015819 | A1* | 1/2011 | Goto | B60W 10/184 340/453 |
| 2011/0066342 | A1* | 3/2011 | Ozaki | B60T 7/042 701/70 |
| 2013/0116878 | A1* | 5/2013 | Terkes | B62D 15/0285 701/23 |
| 2013/0282252 | A1* | 10/2013 | Takagi | B60T 7/22 701/70 |
| 2014/0244070 | A1* | 8/2014 | Inagaki | B62D 15/0285 701/1 |
| 2015/0336551 | A1* | 11/2015 | Okano | B60T 13/142 701/70 |
| 2015/0367845 | A1* | 12/2015 | Sannodo | B60W 10/20 701/23 |
| 2015/0375740 | A1* | 12/2015 | Okamura | B62D 15/0285 701/25 |
| 2016/0272244 | A1* | 9/2016 | Imai | B62D 15/0285 |
| 2017/0120909 | A1* | 5/2017 | Oniwa | B60W 30/143 |
| 2017/0129485 | A1* | 5/2017 | Seo | B62D 15/027 |
| 2017/0253236 | A1* | 9/2017 | Hayakawa | G08G 1/143 |
| 2017/0261326 | A1* | 9/2017 | Mizutani | G01P 21/02 |
| 2018/0056811 | A1* | 3/2018 | Iwahana | H02P 23/30 |
| 2018/0072284 | A1* | 3/2018 | Bales | B60T 8/1708 |
| 2018/0118178 | A1* | 5/2018 | Choi | B60T 7/085 |
| 2018/0208245 | A1* | 7/2018 | Mizutani | B60W 30/06 |
| 2018/0244286 | A1* | 8/2018 | Sakai | B60W 50/10 |
| 2018/0257667 | A1* | 9/2018 | Yoshii | B60W 60/0053 |
| 2018/0265079 | A1* | 9/2018 | Nakada | G05D 1/0223 |
| 2018/0346028 | A1* | 12/2018 | Chang | B60W 10/04 |
| 2019/0031188 | A1* | 1/2019 | Yamashita | B62D 15/0285 |
| 2019/0061740 | A1* | 2/2019 | Ohira | B60W 30/06 |
| 2019/0135247 | A1* | 5/2019 | Luo | B60T 8/172 |
| 2019/0241177 | A1* | 8/2019 | Suzuki | B62D 15/0285 |
| 2019/0258269 | A1* | 8/2019 | Yanagihara | B60W 60/00274 |
| 2019/0291713 | A1* | 9/2019 | Kogure | B60W 10/06 |
| 2020/0031336 | A1* | 1/2020 | Akatsuka | B60W 10/04 |
| 2020/0062242 | A1* | 2/2020 | Hayakawa | B62D 15/0285 |
| 2020/0079361 | A1* | 3/2020 | Suzuki | B62D 15/027 |
| 2020/0114917 | A1* | 4/2020 | Oguro | B60W 30/181 |
| 2020/0122718 | A1* | 4/2020 | Seimiya | B60W 40/09 |
| 2020/0226926 | A1* | 7/2020 | Suzuki | G08G 1/143 |
| 2020/0239020 | A1* | 7/2020 | Aoki | B60W 30/06 |
| 2020/0282975 | A1* | 9/2020 | Minase | B60L 15/30 |
| 2020/0346639 | A1* | 11/2020 | Tashiro | G08G 1/168 |
| 2020/0361449 | A1* | 11/2020 | Suzuki | B62D 15/0285 |
| 2021/0006707 | A1* | 1/2021 | Xu | H04N 23/60 |
| 2021/0024057 | A1* | 1/2021 | Ding | B60T 8/3275 |
| 2021/0078599 | A1* | 3/2021 | Yu | G08G 1/165 |
| 2021/0107454 | A1* | 4/2021 | Iwazawa | B62D 15/0285 |
| 2021/0122362 | A1* | 4/2021 | Okamura | G05D 1/0011 |
| 2021/0213935 | A1* | 7/2021 | Lu | B60C 23/04 |
| 2021/0221361 | A1* | 7/2021 | Zhang | B60W 30/06 |
| 2021/0237717 | A1* | 8/2021 | Zhang | G06V 20/588 |
| 2021/0284136 | A1* | 9/2021 | Sugihira | B60W 10/20 |
| 2021/0291814 | A1* | 9/2021 | Shirozono | G06V 20/586 |
| 2021/0323538 | A1* | 10/2021 | Takahashi | G08G 1/143 |
| 2021/0327271 | A1* | 10/2021 | Li | G08G 1/142 |
| 2021/0354688 | A1* | 11/2021 | Tashiro | B60W 30/06 |
| 2021/0370896 | A1* | 12/2021 | Momose | B60T 8/172 |
| 2021/0387614 | A1* | 12/2021 | Tashiro | B60W 10/18 |
| 2021/0394580 | A1* | 12/2021 | Chopard | G08G 1/143 |
| 2021/0394747 | A1* | 12/2021 | Li | G01S 7/4802 |
| 2022/0003116 | A1* | 1/2022 | Moore | G05D 1/0238 |
| 2022/0051568 | A1* | 2/2022 | Kessler | G06Q 10/063 |
| 2022/0089186 | A1* | 3/2022 | Gotou | B60W 10/20 |
| 2022/0097685 | A1* | 3/2022 | Von Eichhorn | B60W 60/00 |
| 2022/0340175 | A1* | 10/2022 | Strehle | B60W 30/02 |
| 2022/0342415 | A1* | 10/2022 | Suzuki | G05D 1/223 |
| 2022/0350326 | A1* | 11/2022 | Suzuki | G05D 1/0016 |
| 2022/0365527 | A1* | 11/2022 | Suzuki | B60W 30/06 |
| 2022/0379886 | A1* | 12/2022 | Zhou | B60G 17/06 |
| 2023/0073027 | A1* | 3/2023 | Zieglmeier | B60W 50/029 |
| 2023/0123715 | A1* | 4/2023 | Qinglan | B60W 30/182 701/23 |
| 2023/0236037 | A1* | 7/2023 | Heilbron | G08G 1/0133 701/422 |
| 2023/0415570 | A1* | 12/2023 | Jin | B60K 31/0008 |

FOREIGN PATENT DOCUMENTS

| | | |
|---|---|---|
| CN | 107891887 A | 4/2018 |
| CN | 109305195 A | 2/2019 |
| CN | 109572654 A | 4/2019 |
| CN | 110901639 A | 3/2020 |
| CN | 111619594 A | 9/2020 |
| CN | 111746486 A | 10/2020 |
| CN | 112208581 A | 1/2021 |
| CN | 112550255 A | 3/2021 |

OTHER PUBLICATIONS

First Office Action and Search Report dated Jan. 26, 2025, issued in related Chinese Patent Application No. 202110420320.2, with English machine translation (14 pages).

* cited by examiner

VEHICLE PARKING CONTROL METHOD AND APPARATUS

CROSS-REFERENCE TO RELATED APPLICATIONS

This application is a Continuation application of International Patent Application No. PCT/CN2022/080170, filed on Mar. 10, 2022, which is based on and claims priority to and benefits of Chinese Patent Application No. 202110420320.2, filed on Apr. 19, 2021. The entire content of all of the above-referenced applications is incorporated herein by reference.

FIELD

Embodiments of the present disclosure relate to the field of rail transit technologies, and more particularly, to a vehicle parking control method and a vehicle parking control apparatus.

BACKGROUND

At present, domestic urban rail trains are required to be more comfortable. Based on some control programs, a vehicle may be basically free from impact during starting and braking phases, but the vehicle may still have a relatively strong sense of jerk in a parking phase.

Therefore, it is necessary to provide a new vehicle parking control method.

SUMMARY

An embodiment of the present disclosure provides a new technical solution for controlling vehicle parking.

According to a first aspect of the present disclosure, a method for controlling vehicle parking is provided, including: obtaining, by a processor, a current vehicle speed and a current vehicle control level of a vehicle; obtaining, by the processor, a target vehicle speed of the vehicle, and obtaining a target vehicle control level of the vehicle according to the current vehicle control level; obtaining, by the processor, a first vehicle control level according to the current vehicle speed, the target vehicle speed, the current vehicle control level, and the target vehicle control level; and controlling, by the processor, the vehicle to run according to the first vehicle control level.

In an embodiment, the obtaining a first vehicle control level according to the current vehicle speed, the target vehicle speed, the current vehicle control level, and the target vehicle control level includes: determining whether the current vehicle speed is greater than the target vehicle speed; and in response to that the current vehicle speed is not greater than the target vehicle speed, obtaining the first vehicle control level according to the current vehicle control level and the target vehicle control level, the first vehicle control level being not greater than the target vehicle control level and the current vehicle control level.

In an embodiment, the obtaining the first vehicle control level according to the current vehicle control level and the target vehicle control level includes: determining whether the current vehicle control level is greater than the target vehicle control level; and in response to that the current vehicle control level is greater than the target vehicle control level, selecting a vehicle control level that is not greater than the target vehicle control level as the first vehicle control level; or in response to that the current vehicle control level is not greater than the target vehicle control level, selecting the current vehicle control level as the first vehicle control level.

In an embodiment, the obtaining a first vehicle control level according to the current vehicle speed, the target vehicle speed, the current vehicle control level, and the target vehicle control level further includes: in response to that the current vehicle speed is greater than the target vehicle speed, selecting the current vehicle control level as the first vehicle control level.

In an embodiment, the obtaining a target vehicle speed of the vehicle includes: obtaining the target vehicle speed of the vehicle according to formula 1; and formula 1 is: $V=(a+g\times \sin\alpha)\times t$; where $V$ represents the target vehicle speed, $a$ is a deceleration based on a target deceleration of the vehicle or an actual deceleration of the vehicle, $g$ is a gravity acceleration, $\alpha$ represents a current slope of a road section in which the vehicle is located, $t$ is a time based on the target deceleration and the actual deceleration, and the actual deceleration is based on the current vehicle control level.

In an embodiment, the current vehicle control level is positively correlated with the target vehicle control level.

In an embodiment, before the obtaining a current vehicle speed and a current vehicle control level of a vehicle, the method further includes: detecting whether the current vehicle speed of the vehicle is greater than zero; in response to that the current vehicle speed of the vehicle is greater than zero, detecting whether a driving mode of the vehicle is an automatic driving mode; in response to that the driving mode of the vehicle is the automatic driving mode, detecting whether the vehicle is in a parking phase; and in response to that the vehicle is in the parking phase, obtaining the current vehicle speed and the current vehicle control level of the vehicle.

In an embodiment, the method further includes: detecting, by the processor, whether the current vehicle speed is zero; and in response to that the current vehicle speed is zero, applying, by the processor, parking brake to configure a braking force of the vehicle as a target braking force.

According to a second aspect of the present disclosure, an apparatus for controlling vehicle parking is further provided, including a memory and a processor. The memory is configured to store a computer program; and the processor is configured to execute the computer program to implement the method according to the first aspect of the present disclosure.

According to a third aspect of the present disclosure, a non-transitory computer readable storage medium is further provided, and a computer program is stored in the computer readable storage medium. When being executed by a processor, the computer program implements the method according to the first aspect of the present disclosure.

A beneficial effect of the embodiments of the present disclosure is that the vehicle control level of the to-be-parked vehicle can be adjusted in real time as required, such that the target vehicle speed of the vehicle can be adjusted in real time, and the target vehicle control level of the vehicle can be correspondingly adjusted in real time according to the current vehicle control level of the vehicle. Further, the vehicle control level of vehicle running can be adjusted in real time according to the vehicle speed of the vehicle and real-time changes of a current value and a target value of the vehicle control level, so that jerking of the vehicle in the parking phase can be weakened.

Other features and advantages of the embodiments of the present disclosure will become apparent from the following detailed description of some embodiments of the present disclosure with reference to the accompanying drawings.

BRIEF DESCRIPTION OF THE DRAWINGS

The accompanying drawings combined with and forming a part of this specification show embodiments of the present disclosure, and the accompanying drawings are used to explain principles of the embodiments of the present disclosure.

DETAILED DESCRIPTION

Figure 1:
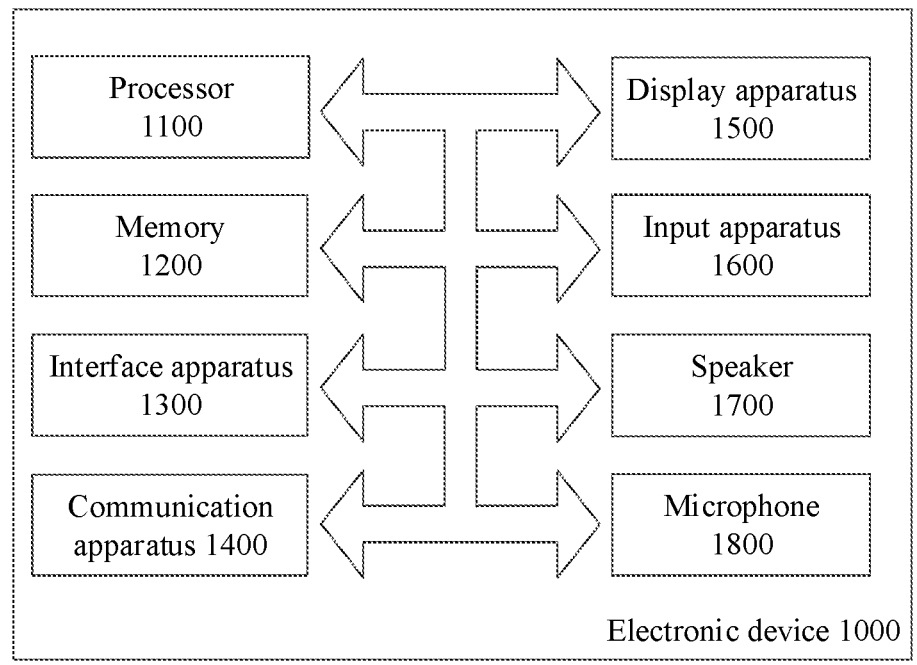
FIG. 1 is a schematic structural diagram of composition of an electronic device that can be applied to a vehicle parking control method according to an embodiment.

Various embodiments of the present disclosure are now be described in detail with reference to the accompanying drawings. It is to be noted that, unless otherwise specified, opposite arrangement, numerical expressions, and numerical values of components and steps described in the embodiments do not limit the scope of the present disclosure.

The following descriptions of at least one embodiment are merely illustrative, and in no way constitute any limitation on the present disclosure and application or use of the present disclosure.

Technologies, methods, and devices known to those of ordinary skill in related arts may not be discussed in detail, but where appropriate, the techniques, the methods, and the devices should be considered as a part of the specification.

In all examples shown and discussed herein, any specific value should be construed as merely examples and not as limitations. Therefore, other examples of the embodiments may have different values.

It is to be noted that, similar numbers and letters represent similar items in the following drawings. Therefore, once an item is defined in one of the drawings, it does not need to be further discussed in the following drawings.

An application scenario of an embodiment of the present disclosure is controlling a vehicle to run in a vehicle parking phase. The vehicle may be an urban rail train.

To control the vehicle running in the vehicle braking phase to reduce vehicle braking impact, an implementation may be as follows: In the vehicle braking phase, a vehicle increases an actual electric braking force value according to a fixed slope, and supplements an air braking force according to the electric braking force value and the fixed slope to reduce a vehicle braking impact rate. However, this implementation of controlling vehicle running in the vehicle braking phase is not applicable to the vehicle parking phase, which causes a relatively strong sense of parking impact and a sense of jerk in the vehicle parking phase, and therefore, a problem of impact in the vehicle parking phase cannot be resolved.

To solve a technical problem existing in the foregoing implementation, a vehicle parking control method is provided, and the method obtains a current vehicle speed and a current vehicle control level of a to-be-parked vehicle; obtains a target vehicle speed of the vehicle, and obtains a target vehicle control level of the vehicle according to the current vehicle control level; obtains a first vehicle control level according to the current vehicle speed, the target vehicle speed, the current vehicle control level, and the target vehicle control level; and controls vehicle running according to the first vehicle control level. In this method, a vehicle control level of vehicle running is adjusted based on a vehicle speed of a to-be-parked vehicle and real-time changes of a current value and a target value of the vehicle control level, so that a sense of jerk of the vehicle in the parking phase can be weakened.

Hardware Configuration

FIG. 1 is a schematic diagram of a hardware configuration of an electronic device 1000 that can implement an embodiment of the present disclosure. The electronic device 1000 may be applied to a vehicle parking control scenario. The vehicle may include the electronic device 1000. The vehicle may be an urban rail train.

The electronic device 1000 may be a smartphone, a portable computer, a desktop computer, a tablet computer, a server, or the like, which is not limited herein.

A hardware configuration of the electronic device 1000 may include but is not limited to a processor 1100, a memory 1200, an interface apparatus 1300, a communication apparatus 1400, a display apparatus 1500, an input apparatus 1600, a speaker 1700, a microphone 1800, and the like. The processor 1100 may be a central processing unit CPU, a graphics processor GPU, a microprocessor MCU, or the like, and is configured to execute a computer program. The computer program may be written by using an instruction set of an architecture such as x86, Arm, RISC, MIPS, and SSE. The memory 1200 includes, for example, a ROM (read-only memory), a RAM (random access memory), a non-volatile memory such as a hard disk, and the like. The interface apparatus 1300 includes, for example, a USB interface, a serial interface, and a parallel interface. For example, the communication apparatus 1400 may perform wired communication by using an optical fiber or a cable, or perform wireless communication, which may include Wi-Fi communication, Bluetooth communication, 2G/3G/4G/5G communication, and the like. The display apparatus 1500 is, for example, a liquid crystal display screen, a touch display screen, or the like. The input apparatus 1600 may include, for example, a touchscreen, a keyboard, a somatosensory input, and the like. A user may input/output voice messages by using the speaker 1700 and the microphone 1800.

In this embodiment of the present disclosure, the memory 1200 of the electronic device 1000 is configured to store instructions, and the instructions are used to control the processor 1100 to perform an operation to support implementation of the vehicle parking control method according to any embodiment of the present disclosure. A person skilled in the art may design instructions according to the solutions disclosed herein. How the instructions control the processor to perform an operation is well-known in the art. Therefore, details are not described herein. An intelligent operating system (for example, a system such as Windows, Linux, Android, or IOS) and application software may be installed in the electronic device 1000.

FIG. 1 shows multiple apparatuses of the electronic device 1000. The electronic device 1000 in this embodiment of the present disclosure may relate to a part of the apparatuses, for example, the processor 1100 and the memory 1200. This is well-known in the art, and details are not described herein.

The following describes the embodiments and examples according to the present disclosure with reference to the accompanying drawings.

Method Embodiment

Figure 2:
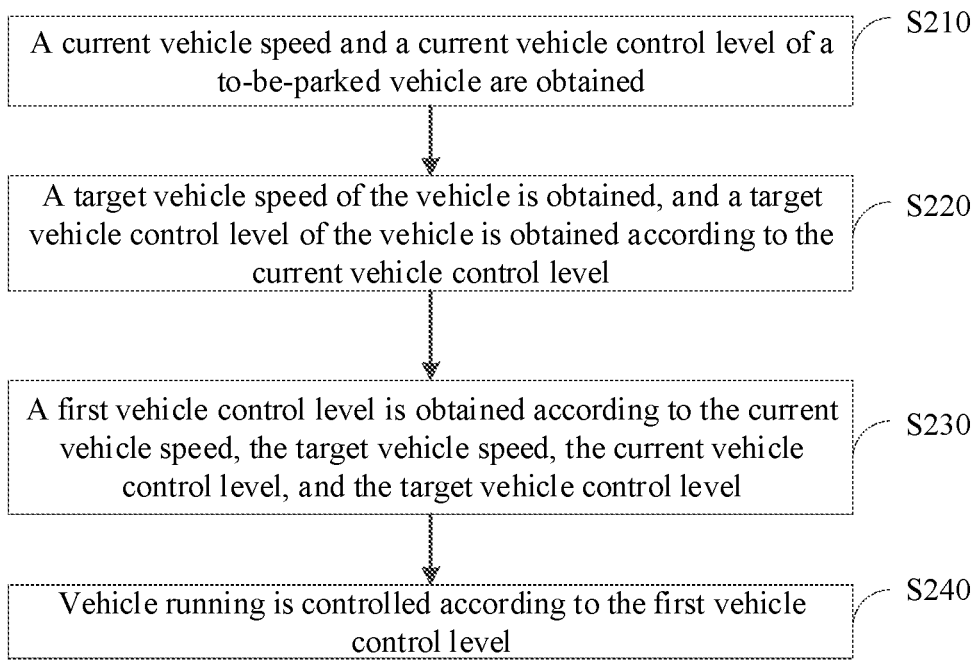
FIG. 2 is a schematic flowchart of a vehicle parking control method according to an embodiment.

FIG. 2 is a schematic flowchart of a vehicle parking control method according to an embodiment. An implementation body of this embodiment is, for example, the electronic device 1000 shown in FIG. 1. The vehicle may include the electronic device 1000.

As shown in FIG. 2, the vehicle parking control method in this embodiment may include the following steps S210-S240.

In step S210, a current vehicle speed and a current vehicle control level of a to-be-parked vehicle are obtained.

A vehicle to which this embodiment is applicable may be an urban rail train, and may be a single-module (or referred to as a compartment) or a multi-module vehicle, which has a strong versatility. When the to-be-parked vehicle is a multi-module vehicle, a vehicle speed and a vehicle control level of each single module included in the vehicle are generally consistent, and the operation control is separately performed on each single module, so as to implement a unified vehicle control effect.

In this embodiment, to adjust the vehicle control level of vehicle running, step S210 is performed, to first obtain the current vehicle speed and the current vehicle control level of the to-be-parked vehicle.

In some embodiments, a time interval may be set, and vehicle parking control method is periodically executed based on the time interval, so as to implement real-time adjustment of the vehicle control level of vehicle running as required. For example, the time interval may be one or more vehicle control period duration, or may be any time value set as required.

In an embodiment of the present disclosure, for the vehicle control level, a maximum vehicle control level may be 100%, and a minimum vehicle control level may be 0%. In a vehicle parking phase, a larger vehicle control level indicates a larger corresponding deceleration.

In an embodiment of the present disclosure, whether a vehicle is a to-be-parked vehicle may be determined by using vehicle running data. For example, a vehicle whose vehicle speed is greater than zero, that runs in an automatic driving mode, and that is in a parking phase may be determined as a to-be-parked vehicle, and the vehicle parking control method in this embodiment is to be performed for the to-be-parked vehicle, so as to reduce a sense of jerk of the vehicle in the parking phase.

Based on this, in an embodiment of the present disclosure, before step S210 of obtaining the current vehicle speed and the current vehicle control level of the to-be-parked vehicle, the method further includes the following steps S2001-S2003:

In step S2001, whether a vehicle speed of the vehicle is greater than zero is detected.

In an embodiment, a vehicle automatic driving system may determine, by collecting or receiving a vehicle speed signal in real time, whether the vehicle speed is greater than 0. In an implementation, when the vehicle speed is not greater than 1 km/h, it may be considered that the vehicle speed is 0.

In step S2002, when the vehicle speed of the vehicle is greater than zero, whether a driving mode of the vehicle is an automatic driving mode is detected.

In step S2003, when the driving mode of the vehicle is the automatic driving mode, whether the vehicle is in a parking phase is detected, and when the vehicle is in the parking phase, step S210 is performed to obtain the current vehicle speed and the current vehicle control level of the to-be-parked vehicle.

In detail, the vehicle automatic driving system determines whether the vehicle needs to be parked. When the vehicle needs to be parked, a subsequent parking control procedure is executed. When the vehicle does not need to be parked, the vehicle may end the current procedure and travel normally.

In an embodiment of the present disclosure, when it is detected that the vehicle speed is zero, the driving mode of the vehicle is not in the automatic driving mode, and the vehicle is not in any one or more of parking phases, the foregoing step S210 may not be performed or no longer be performed.

In step S220, a target vehicle speed of the vehicle is obtained, and a target vehicle control level of the vehicle is obtained according to the current vehicle control level obtained in step S210.

In this embodiment, the corresponding target vehicle control level may be obtained according to the current vehicle control level.

Based on this, the vehicle control level of vehicle running may be determined according to a current value and a target value of each of the vehicle speed and the vehicle control level of the vehicle, that is, whether the vehicle control level of vehicle running currently needs to be changed and how to be changed.

In the vehicle parking phase, because the vehicle control level of vehicle running changes in real-time as required, the target vehicle speed and the target vehicle control level corresponding to the vehicle change correspondingly change in real-time. Therefore, the vehicle control level determined accordingly may better conform to a current running status of the vehicle, so as to ensure accurate determining of the vehicle control level, and to avoid a sense of jerk when the vehicle runs at an improper vehicle control level.

In an embodiment of the present disclosure, the current vehicle control level is positively correlated with the target vehicle speed. In this embodiment, in any vehicle control period, a larger current vehicle control level of the vehicle causes a relatively larger target vehicle speed of the vehicle, and vice versa.

In an embodiment of the present disclosure, the current vehicle control level is positively correlated with the target vehicle control level. In this embodiment, in any vehicle control period, a larger current vehicle control level of the vehicle causes a relatively large target vehicle control level of the vehicle, and vice versa.

In an embodiment of the present disclosure, the corresponding target vehicle speed may be obtained according to the current vehicle control level. For example, the target vehicle speed may be calculated according to a formula $V = V0 + a \times t$.

In this formula, V represents the target vehicle speed, $V0 \leq 1$ km/h, a is a deceleration that depends on a target deceleration of the vehicle and/or an actual deceleration of the vehicle, t is a time that depends on the target deceleration and the actual deceleration, and the actual deceleration depends on the current vehicle control level. When V0 is zero, the formula may be further adjusted to $V = a \times t$.

Based on the foregoing content, considering that a slope of a road section during vehicle running may also affect vehicle parking, to improve accurate control of the to-be-parked vehicle, in addition to the vehicle control level, the target vehicle speed may be calculated with reference to a current slope value.

Based on this, in an embodiment of the present disclosure, the obtaining a target vehicle speed of the vehicle includes: obtaining the target vehicle speed of the vehicle according to formula 1.

In this embodiment, the corresponding target vehicle speed may be obtained based on changes of the vehicle control level and the slope of the road section in which the vehicle is located, that is, the target vehicle speed may be calculated according to the current vehicle control level and the current slope.

Formula 1 is: $V=(a+g\times\sin \alpha)\times t$, where V represents the target vehicle speed, a is a deceleration based on a target deceleration of the vehicle and/or an actual deceleration of the vehicle, g is a gravity acceleration, $\alpha$ represents a current slope of a road section in which the vehicle is located, t is a time based on the target deceleration and the actual deceleration, and the actual deceleration based on the current vehicle control level.

In this embodiment, for a traveling direction of the vehicle, if the road section in which the vehicle is located is an upward slope section, a value of the current slope is generally a positive value; or if the road section in which the vehicle is located is a downward slope section, the value of the current slope is generally a negative value.

It should be noted that, in formula 1, it may be considered that the vehicle speed (V0) at the end of the parking phase is zero.

Based on the foregoing content, it may be further set that the vehicle speed (V0) at the end of the parking phase is not greater than 1 km/h. In this way, the foregoing formula 1 may further be correspondingly adjusted to $V=V0+(a+g\times\sin \alpha)\times t$.

In this embodiment, $g\times\sin \alpha$ represents a deceleration caused by the vehicle weight. $g\times\sin \alpha=m\times g\times\sin \alpha/m$ and m represent the compartment weight.

In an implementation, a value of a may be a target deceleration, may be an actual deceleration, or may be an average value of the two, or may be a weighted sum of the two. Weights of the two may be set by a designer as required, and a sum of the weights of the two may be 1.

Based on this, in an embodiment of the present disclosure, $a=(a1+a2)/2$.

a1 represents a target deceleration used to control an impact rate in the parking phase, and a2 represents an actual deceleration.

In an implementation, $a1=J\times\Delta t$.

J represents a target impact rate Jerk in the parking phase. $J\leq 0.75$ or $J\leq 1$ may be obtained according to an actual vehicle requirement value and with reference to a related industry standard requirement.

$\Delta t$ represents a time when a deceleration changes to 0 instantly during parking, and $\Delta t\leq 0.5$ s. For example, $\Delta t = 0.2$ s.

In an implementation, $a2=x\times amax$.

x represents the current vehicle control level of the vehicle, and amax represents a braking system deceleration corresponding to a 100% level of the vehicle. For example, amax=1.0.

In an implementation, $t=A\times(a2-a1)/k$.

A represents an adjustment coefficient. In this embodiment, considering that time is required for both a network signal and braking execution, this part of time may be taken into consideration, and a value of A is combined to obtain a more accurate value oft. A value of A may be selected according to an actual state of a vehicle network delay time. For example, the value of A may be A=1.1.

k represents a vehicle braking deceleration control slope. $k\leq 0.75$ or $k\leq 1$ may be obtained according to an actual vehicle requirement value and with reference to a related industry standard requirement.

Based on the foregoing content, in an embodiment of the present disclosure, the target vehicle speed may be calculated by using the following formula:

$$V=V0+[(a1+a2)/2]\times t+g\times\sin \alpha\times t=V0+[(J\times\Delta t+x\times amax)/2]\times[A\times(x\times amax-J\times\Delta t)/k]+g\times\sin \alpha\times[A\times(x\times amax-J\times\Delta t)/k]$$

V0 is zero, and generally may be $V0\leq 1$ km/h.

In this embodiment, the vehicle automatic driving system may collect or receive a speed signal and a slope signal in real time, and then calculate in real time, by using the vehicle speed and the slope of the vehicle location, a speed at which impact is controlled in the vehicle parking phase, so as to implement corresponding adjustment on the vehicle control level of vehicle running based on a comparison between the current vehicle speed and the speed, thereby achieving controlling an impact rate in the vehicle parking phase.

In this embodiment, the corresponding target vehicle control level may be obtained based on the change of the vehicle control level of the vehicle, that is, the target vehicle control level may be calculated according to the current vehicle control level.

Based on the foregoing content, in an embodiment of the present disclosure, the target vehicle control level may be calculated by using the following formula: $X=a1/a2=(J\times\Delta t)/(x\times amax)$.

X represents the target vehicle control level used to control the impact rate in the parking phase.

In an embodiment, the vehicle deceleration can be obtained without the need to arrange another device in the vehicle. For example, an acceleration sensor does not need to be additionally arranged to collect the vehicle deceleration, so that corresponding cost input can be avoided.

Based on the foregoing content, in any vehicle control period, after the current value and the target value of each of the vehicle speed and the vehicle control level of the vehicle are obtained, the following step S230 may be performed, so as to determine the vehicle is controlled to run at which vehicle control level.

In step S230, a first vehicle control level is obtained according to the current vehicle speed, the target vehicle speed, the current vehicle control level, and the target vehicle control level.

In this embodiment, the first vehicle control level is obtained according to the current value and the target value of each of the vehicle speed and the vehicle control level of the vehicle, so that the vehicle can be controlled to run at the first vehicle control level. In this way, the first vehicle control level is generally the current vehicle control level obtained when the foregoing step S210 is performed next time.

In an embodiment of the present disclosure, to describe an implementation of obtaining the first vehicle control level, step S230 of obtaining the first vehicle control level according to the current vehicle speed, the target vehicle speed, the current vehicle control level, and the target vehicle control level may include the following step S2301 and S2302:

In step S2301, the current vehicle speed is compared with the target vehicle speed.

In this step, a speed value of the current vehicle speed is compared with a speed value of the target vehicle speed, and a subsequent step is performed according to a comparison result. When the current vehicle speed is not greater than the target vehicle speed, the following step S2302 is performed.

In step S2302, when the current vehicle speed is not greater than the target vehicle speed, the first vehicle control level is obtained according to the current vehicle control level and the target vehicle control level. The first vehicle control level is not greater than the target vehicle control level and the current vehicle control level.

In this step, the current vehicle speed is not greater than the target vehicle speed, which indicates that a vehicle speed reduction condition may support the vehicle to run directly at a lower vehicle control level, and may run at any vehicle control level that is not greater than the target vehicle control level and not greater than the current vehicle control level.

In an embodiment, in each of two corresponding vehicle control periods, when it is determined that the current vehicle speed is not greater than the target vehicle speed, the first vehicle control level determined in the previous period is not less than the first vehicle control level determined in the subsequent period, so that the first vehicle control level generally tends to decline in the vehicle parking phase, thereby helping to avoid a sense of jerk during parking.

Based on the foregoing content, in an embodiment of the present disclosure, in step S2302, the obtaining the first vehicle control level according to the current vehicle control level and the target vehicle control level includes the following steps S23021-S23023.

In step S23021, the current vehicle control level is compared with the target vehicle control level, and the following step S23022 or step S23023 is performed.

In this step, level values of the current vehicle control level and the target vehicle control level are compared, and a subsequent step is performed according to a comparison result.

In step S23022, when the current vehicle control level is greater than the target vehicle control level, a vehicle control level that is not greater than the target vehicle control level is used as the first vehicle control level.

In this case, the current vehicle control level is higher than the target vehicle control level, which indicates that the current vehicle control level is slightly higher. Therefore, the control level can be reduced to obtain the first vehicle control level that is not greater than the target vehicle control level.

In step S23023, when the current vehicle control level is not greater than the target vehicle control level, the current vehicle control level is used as the first vehicle control level.

In this case, the current vehicle control level is not higher than the target vehicle control level, which indicates that the current vehicle control level is ideal. Therefore, the current vehicle control level can be maintained.

In this embodiment, an implementation of determining the first vehicle control level when the current vehicle speed is not greater than the target vehicle speed is described. However, when the current vehicle speed is greater than the target vehicle speed, determining the first vehicle control level may be as follows.

In an embodiment of the present disclosure, step S230 of obtaining a first vehicle control level according to the current vehicle speed, the target vehicle speed, the current vehicle control level, and the target vehicle control level further includes: Step S2303: When the current vehicle speed is greater than the target vehicle speed, the current vehicle control level is used as the first vehicle control level.

In this embodiment, after step S2301 is completed, step S2302 or step S2303 may be performed.

In this embodiment, when the current vehicle speed is greater than the target vehicle speed, it indicates that the vehicle speed is currently slightly faster. To support rapid and smooth speed reduction of the vehicle, the current vehicle control level can be maintained. When the vehicle speed is reduced to not higher than the corresponding target vehicle speed, the first vehicle control level is determined with reference to the target vehicle control level.

In the vehicle parking control method in this embodiment, through real-time collection and calculation operations, real-time adjustment of the impact rate during vehicle parking can be implemented in all operating conditions of the vehicle, thereby improving passenger ride comfort in the vehicle parking phase.

In Step S240, vehicle running is controlled according to the first vehicle control level.

Based on the foregoing content, a relatively proper first vehicle control level may be obtained, so that the vehicle may be controlled to run at the first vehicle control level.

Then, the foregoing step S210 may be performed again. In this way, the real-time change of the first vehicle control level is determined according to the real-time changes of the current value and the target value of each of the vehicle speed and the vehicle control level, so that the vehicle always runs in the parking phase at a vehicle control level that meets a current running status, so that the vehicle parking phase is basically free of impact, and a sense of jerk in the vehicle parking phase is reduced.

In this embodiment, the foregoing steps S210-S240 may be periodically performed in the vehicle parking phase. That is, in each execution period, the electronic device 1000 may adjust the target vehicle speed of the to-be-parked vehicle, and correspondingly adjust the target vehicle control level of the vehicle according to the current vehicle control level of the to-be-parked vehicle; and further adjust the vehicle control level of vehicle running according to the vehicle speed and the real-time changes of the current value and the target value of the vehicle control level, and control the vehicle to run at the vehicle control level, which is repeated until the vehicle is parked. In this embodiment of the present disclosure, the vehicle control level of the to-be-parked vehicle may be adjusted in real-time as required, and therefore, when vehicle running is controlled accordingly, a sense of jerk of the vehicle in the parking phase can be reduced.

In this embodiment, the foregoing electronic device 1000 may be an internal part of the vehicle, so that when a vehicle automatic driving signal system controls the vehicle, a related value is independently calculated, thereby facilitating more rapid adjustment of the vehicle to a target state.

Based on the foregoing content, when the to-be-parked vehicle is in the vehicle parking phase, the vehicle speed of the to-be-parked vehicle decreases to zero with time, so as to implement vehicle parking. To avoid a case in which the vehicle slides after the vehicle is parked, parking brake may be applied after the vehicle is parked.

Based on this, in an embodiment of the present disclosure, the method further includes: detecting whether the current vehicle speed is zero; and when the current vehicle speed is zero, applying parking brake to configure a braking force of the vehicle as a set target value.

In this embodiment, if the current vehicle speed of the to-be-parked vehicle is zero, for example, a speed that is not greater than 1 km/h, it may be considered that the vehicle is parked. Therefore, a parking brake signal may be applied, so as to establish a vehicle braking force to a parking brake target value, so as to avoid vehicle sliding.

In an embodiment of the present disclosure, after the foregoing step S240, the method further includes: detecting whether the vehicle parking phase is completed; and when the vehicle parking phase is completed, applying a vehicle deceleration to a set target value, and when the vehicle parking phase is not completed, performing the foregoing step S210 again.

In detail, after the foregoing step S240, it may be detected whether the current vehicle speed reaches zero, and if the current vehicle speed reaches zero, it may be considered that the vehicle parking phase is completed. After the vehicle is parked, parking brake may be applied to establish a braking force to a parking brake target value, so as to avoid vehicle sliding in a vehicle parked state.

Figure 3:
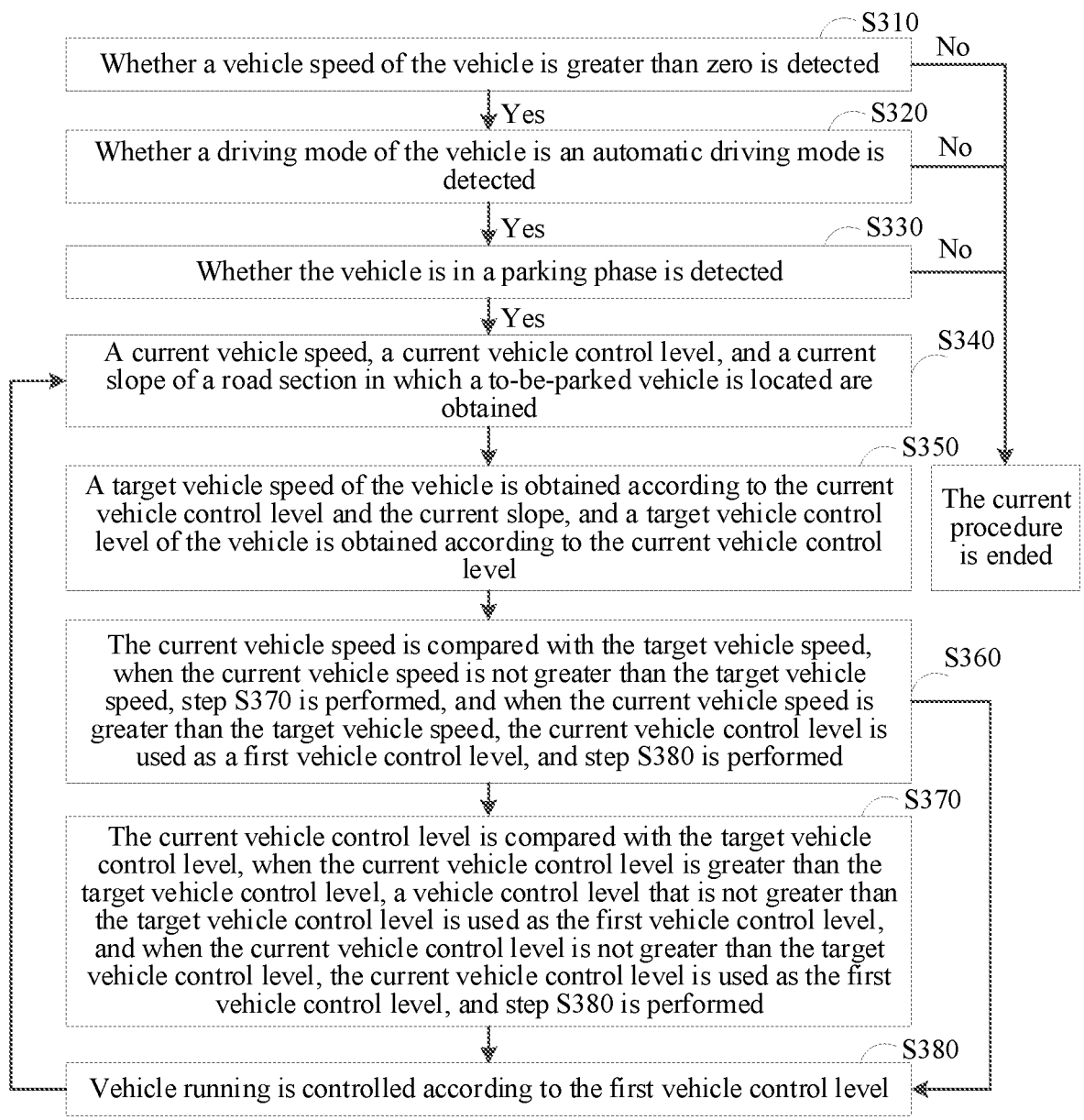
FIG. 3 is a schematic flowchart of a vehicle parking control method according to another embodiment.

FIG. 3 is a schematic flowchart of a vehicle parking control method according to an embodiment. An implementation body of this embodiment is, for example, the electronic device 1000 shown in FIG. 1.

As shown in FIG. 3, the method in this embodiment may include the following steps S310-S380.

In Step S310, whether a vehicle speed of a vehicle is greater than zero is detected, when the vehicle speed of the vehicle is greater than zero, step S320 is performed, and when the vehicle speed of the vehicle is not greater than zero, the current procedure is ended.

In step S320, whether a driving mode of the vehicle is an automatic driving mode is detected, when the driving mode of the vehicle is the automatic driving mode, step S330 is performed, and when the driving mode of the vehicle is not the automatic driving mode, the current procedure is ended.

In step S330, whether the vehicle is in a vehicle parking phase is detected, when the vehicle is in the vehicle parking phase, step S340 is performed, and when the vehicle is not in the vehicle parking phase, the current procedure is ended.

In step S340, a current vehicle speed, a current vehicle control level, and a current slope of a road section in which a to-be-parked vehicle is located are obtained.

In step S350, a target vehicle speed of the vehicle is obtained according to the current vehicle control level and the current slope, and a target vehicle control level of the vehicle is obtained according to the current vehicle control level.

For a calculation process of the target vehicle speed and the target vehicle control level, refer to the foregoing related content. Details are not described herein in this embodiment.

In step S360, the current vehicle speed is compared with the target vehicle speed, when the current vehicle speed is not greater than the target vehicle speed, step S370 is performed, and when the current vehicle speed is greater than the target vehicle speed, the current vehicle control level is used as a first vehicle control level, and step S380 is performed.

In step S370, the current vehicle control level is compared with the target vehicle control level, when the current vehicle control level is greater than the target vehicle control level, a vehicle control level that is not greater than the target vehicle control level is used as the first vehicle control level, and when the current vehicle control level is not greater than the target vehicle control level, the current vehicle control level is used as the first vehicle control level, and step S380 is performed.

In step S380, vehicle running is controlled according to the first vehicle control level, and step S340 is performed.

In this embodiment, an operation related to determining the vehicle control level of the to-be-parked vehicle may be periodically performed in the vehicle parking phase. That is, in each execution period, the electronic device 1000 may adjust the target vehicle speed of the to-be-parked vehicle, and correspondingly adjust the target vehicle control level of the vehicle according to the current vehicle control level of the to-be-parked vehicle; and further adjust the vehicle control level of vehicle running according to the vehicle speed and the real-time changes of the current value and the target value of the vehicle control level, and control the vehicle to run at the vehicle control level, which is repeated until the vehicle is parked. In this embodiment of the present disclosure, the vehicle control level of the to-be-parked vehicle may be adjusted in real-time as required, and therefore, when vehicle running is controlled accordingly, a sense of jerk of the vehicle in the parking phase can be reduced.

This embodiment provides an algorithm and a control policy for vehicle automatic driving in the vehicle parking phase, so as to ensure that impact meets a vehicle parking requirement, and greatly improve passenger ride comfort.

Device Embodiment

Figure 4:
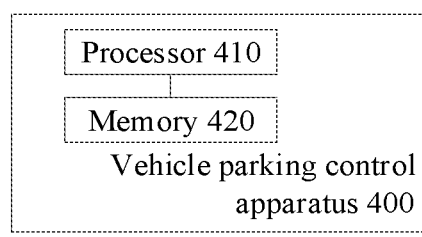
FIG. 4 is a schematic structural diagram of hardware of an electronic device according to an embodiment.

FIG. 4 is a schematic structural diagram of hardware of a vehicle parking control apparatus according to an embodiment.

As shown in FIG. 4, the vehicle parking control apparatus 400 includes a processor 410 and a memory 420. The memory 420 is configured to store an executable computer program. The processor 410 is configured to execute the method in the foregoing any method embodiment according to control of the computer program.

The vehicle parking control apparatus 400 may be the electronic device 1000 shown in FIG. 1, or may include the electronic device 1000.

Modules of the vehicle parking control apparatus 400 may be implemented by a computer program stored in the memory 420 executed by the processor 410 in this embodiment, or may be implemented by using another circuit structure, which is not limited herein.

In addition, an embodiment of the present disclosure further provides a computer readable storage medium (e.g., a non-transitory computer readable storage medium). The computer readable storage medium stores a computer program. When being executed by a processor, the computer program implements the method according to any one of the embodiments of the present disclosure.

The present disclosure may be a system, a method, and/or a computer program product. The computer program product may include a computer readable storage medium, and the computer readable storage medium carries computer readable program instructions used to cause the processor to implement various aspects of the present disclosure.

The computer-readable storage medium may be a tangible device that can save and store instructions used by an instruction execution device. The computer-readable storage medium may be, for example, but is not limited to an electrical storage device, a magnetic storage device, an optical storage device, an electromagnetic storage device, a semiconductor storage device, or any proper combination thereof. More examples (non-exhaustive lists) of the computer readable storage medium include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanical coding device, a punch card or a protruding structure in a groove on which instructions are stored, and any proper combination thereof. The computer-readable storage medium used herein is not interpreted as a transient signal, such as a radio wave or another freely propagated electromagnetic wave, an electromagnetic wave (for example, an optical pulse through a fiber cable) propagated through a waveguide or other transmission medium, or an electrical signal transmitted through a wire.

The computer-readable program instructions described herein may be downloaded from the computer-readable storage medium to various computing/processing devices, or to an external computer or an external storage device through a network, such as the internet, a local area network, a wide area network, and/or a wireless network. The network may include a copper transmission cable, fiber transmission, wireless transmission, a router, a firewall, a switch, a gateway computer, and/or an edge server. A network adapter or a network interface in each computing/processing device receives computer-readable program instructions from the network and forwards the computer-readable program instructions, to store the computer-readable program instructions in the computer-readable storage medium in each computing/processing device.

The computer program instructions used to perform the operations of the present disclosure may be assembly instructions, instruction set architecture (ISA) instructions, machine instructions, machine-related instructions, microcode, firmware instructions, status setting data, or source code or target code written in any combination of one or more programming languages. The programming languages include object-oriented programming languages such as Smalltalk and C++, and conventional procedural programming languages such as a "C" language or a similar programming language. The computer-readable program instructions may be completely executed on a user computer, partially executed on a user computer, executed as a separate software package, partially executed on a remote computer, or completely executed on a remote computer or server. In a case of a remote computer, the remote computer may be connected to a user computer through any type of network, including a local area network (LAN) or a wide area network (WAN), or may be connected to an external computer (for example, through the internet by using an internet service provider). In some embodiments, an electronic circuit such as a programmable logic circuit, a field programmable gate array (FPGA), or a programmable logic array (PLA) may be customized by using status information of the computer-readable program instructions. The electronic circuit may execute the computer-readable program instructions to implement the methods in the aspects of the present disclosure.

Various aspects of the present disclosure are described herein with reference to the flowcharts and/or block diagrams of the method, the apparatus (system), and the computer program product according to embodiments of the present disclosure. It should be understood that the computer-readable program instructions may be used to implement each procedure and/or each block in the flowcharts and/or the block diagrams and a combination of a procedure and/or a block in the flowcharts and/or the block diagrams.

These computer-readable program instructions may be provided for a general-purpose computer, a dedicated computer, or a processing unit of any other programmable data processing apparatus to generate a machine, so that the instructions executed by the computer or the processing unit of another programmable data processing apparatus generate an apparatus for implementing functions/actions in one or more procedures in the flowcharts and/or in one or more blocks in the block diagrams. These computer-readable program instructions may be stored in a computer-readable storage medium that can enable a computer, a programmable data processing apparatus, and/or another device to work in a manner, so that the computer-readable medium storing the instructions includes an artifact. The artifact includes instructions for implementing various aspects of the functions/actions specified in one or more procedures in the flowcharts and/or one or more blocks in the block diagrams.

The computer-readable program instructions may be loaded onto the computer, another programmable data processing apparatus, or another device, so that a series of operations and steps are performed on the computer, another programmable data processing apparatus, or another device, to generate computer-implemented processing. Therefore, the instructions executed on the computer, another programmable data processing apparatus, or another device implement specified functions/actions in one or more procedures in the flowcharts and/or in one or more blocks in the block diagrams.

The flowcharts and the block diagrams in the accompanying drawings display system architectures, functions, and operations that may be implemented by systems, methods, and computer program products according to multiple embodiments of the present disclosure. In view of this, each procedure in the flowchart or each block in the block diagram may represent a part of a module, a program segment, or an instruction. The part of the module, the program segment, or the instruction includes one or more executable instructions used to implement a specified logical function. In some alternative implementations, functions remarked in the block may also occur in a sequence different from that remarked in the accompanying drawings. For example, two consecutive blocks can actually be executed substantially in parallel, and sometimes may be executed in reverse order, depending on the functions. It should be noted that each block in the block diagram and/or each procedure in the flowchart, and a combination of blocks in the block diagrams and/or procedures in the flowcharts may be implemented by a dedicated hardware-based system that performs specified functions or actions, or may be implemented by a combination of dedicated hardware and computer instructions. It is well-known to a person skilled in the art that implementation in a hardware manner, implementation in a software manner, and implementation in a combination of software and hardware are equivalent.

Embodiments of the present disclosure have been described above. The descriptions are examples but not exhaustive, and are not limited to the disclosed embodiments. Many modifications and changes are apparent to a person of ordinary skill in the art without departing from the scope and spirit of the described embodiments. Selection of the terms used in the present disclosure is intended to best explain the principles of embodiments, actual application, or improvements to the technology in the market, or to enable another person of ordinary skill in the art to understand embodiments disclosed in this specification. The scope of the present disclosure may be defined by the appended claims.

What is claimed is:

1. A method for controlling vehicle parking, comprising:
   obtaining, by a processor, a current vehicle speed and a current vehicle control level of a vehicle;
   obtaining, by the processor, a target vehicle speed of the vehicle, and obtaining a target vehicle control level of the vehicle according to the current vehicle control level;
   obtaining, by the processor, a first vehicle control level according to the current vehicle speed, the target vehicle speed, the current vehicle control level, and the target vehicle control level, the obtaining the first vehicle control level comprising:
in response to that the current vehicle speed is greater than the target vehicle speed, selecting the current vehicle control level as the first vehicle control level; and
controlling, by the processor, the vehicle to run according to the first vehicle control level.

2. The method according to claim 1, wherein the obtaining, by the processor, a first vehicle control level according to the current vehicle speed, the target vehicle speed, the current vehicle control level, and the target vehicle control level comprises:
determining whether the current vehicle speed is greater than the target vehicle speed; and
in response to that the current vehicle speed is not greater than the target vehicle speed, obtaining the first vehicle control level according to the current vehicle control level and the target vehicle control level, the first vehicle control level being not greater than the target vehicle control level and the current vehicle control level.

3. The method according to claim 2, wherein the obtaining the first vehicle control level according to the current vehicle control level and the target vehicle control level comprises:
determining whether the current vehicle control level is greater than the target vehicle control level; and
in response to that the current vehicle control level is greater than the target vehicle control level, selecting a vehicle control level that is not greater than the target vehicle control level as the first vehicle control level; or
in response to that the current vehicle control level is not greater than the target vehicle control level, selecting the current vehicle control level as the first vehicle control level.

4. The method according to claim 1, wherein a vehicle control level is indicative of and positively correlated with a deceleration of the vehicle.

5. The method according to claim 1, wherein the obtaining, by the processor, a target vehicle speed of the vehicle comprises: obtaining the target vehicle speed of the vehicle according to formula 1, wherein
formula 1 is: $V=(a+g \times \sin \alpha) \times t$,
wherein V represents the target vehicle speed, a is a deceleration based on a target deceleration of the vehicle or an actual deceleration of the vehicle, g is a gravity acceleration, $\alpha$ represents a current slope of a road section in which the vehicle is located, t is a time based on the target deceleration and the actual deceleration, and the actual deceleration is based on the current vehicle control level.

6. The method according to claim 1, wherein the current vehicle control level is positively correlated with the target vehicle control level.

7. The method according to claim 1, wherein before the obtaining, by the processor, a current vehicle speed and a current vehicle control level of a vehicle, the method further comprises:
detecting whether the current vehicle speed of the vehicle is greater than zero;
in response to that the current vehicle speed of the vehicle is greater than zero, detecting whether a driving mode of the vehicle is an automatic driving mode;
in response to that the driving mode of the vehicle is the automatic driving mode, detecting whether the vehicle is in a parking phase; and
in response to that the vehicle is in the parking phase, obtaining the current vehicle speed and the current vehicle control level of the vehicle.

8. The method according to claim 1, further comprising:
detecting, by the processor, whether the current vehicle speed is zero; and
in response to that the current vehicle speed is zero, applying, by the processor, parking brake to configure a braking force of the vehicle as a target braking force.

9. An apparatus for controlling vehicle parking, comprising a memory and a processor, the memory being configured to store a computer program, and the processor being configured to execute the computer program to perform operations comprising:
obtaining a current vehicle speed and a current vehicle control level of a vehicle;
obtaining a target vehicle speed of the vehicle, and obtaining a target vehicle control level of the vehicle according to the current vehicle control level;
obtaining a first vehicle control level according to the current vehicle speed, the target vehicle speed, the current vehicle control level, and the target vehicle control level, the obtaining the first vehicle control level comprising:
in response to that the current vehicle speed is greater than the target vehicle speed, selecting the current vehicle control level as the first vehicle control level; and
controlling the vehicle to run according to the first vehicle control level.

10. The apparatus according to claim 9, wherein the obtaining a first vehicle control level according to the current vehicle speed, the target vehicle speed, the current vehicle control level, and the target vehicle control level comprises:
determining whether the current vehicle speed is greater than the target vehicle speed; and
in response to that the current vehicle speed is not greater than the target vehicle speed, obtaining the first vehicle control level according to the current vehicle control level and the target vehicle control level, the first vehicle control level being not greater than the target vehicle control level and the current vehicle control level.

11. The apparatus according to claim 10, wherein the obtaining the first vehicle control level according to the current vehicle control level and the target vehicle control level comprises:
determining whether the current vehicle control level is greater than the target vehicle control level; and
in response to that the current vehicle control level is greater than the target vehicle control level, selecting a vehicle control level that is not greater than the target vehicle control level as the first vehicle control level; or
in response to that the current vehicle control level is not greater than the target vehicle control level, selecting the current vehicle control level as the first vehicle control level.

12. The apparatus according to claim 9, wherein a vehicle control level is indicative of and positively correlated with a deceleration of the vehicle.

13. The apparatus according to claim 9, wherein the obtaining a target vehicle speed of the vehicle comprises: obtaining the target vehicle speed of the vehicle according to formula 1, wherein formula 1 is: $V=(a+g \times \sin \alpha) \times t$, wherein V represents the target vehicle speed, a is a deceleration based on a target deceleration of the vehicle or an actual deceleration of the vehicle, g is a gravity acceleration, a represents a current slope of a road section in which the vehicle is located, t is a time based on the target deceleration and the actual deceleration, and the actual deceleration is based on the current vehicle control level.

14. The apparatus according to claim 9, wherein the current vehicle control level is positively correlated with the target vehicle control level.

15. The apparatus according to claim 9, wherein before the obtaining a current vehicle speed and a current vehicle control level of a vehicle, the operations further comprise:
detecting whether the current vehicle speed of the vehicle is greater than zero;
in response to that the current vehicle speed of the vehicle is greater than zero, detecting whether a driving mode of the vehicle is an automatic driving mode;
in response to that the driving mode of the vehicle is the automatic driving mode, detecting whether the vehicle is in a parking phase; and
in response to that the vehicle is in the parking phase, obtaining the current vehicle speed and the current vehicle control level of the vehicle.

16. The apparatus according to claim 9, the operations further comprise:
detecting whether the current vehicle speed is zero; and
in response to that the current vehicle speed is zero, applying parking brake to configure a braking force of the vehicle as a target braking force.

17. A non-transitory computer readable storage medium, the non-transitory computer readable storage medium storing a computer program, wherein when the computer program is executed by a processor, the processor is configured to execute the computer program to perform operations comprising:
obtaining a current vehicle speed and a current vehicle control level of a vehicle;
obtaining a target vehicle speed of the vehicle, and obtaining a target vehicle control level of the vehicle according to the current vehicle control level;
obtaining a first vehicle control level according to the current vehicle speed, the target vehicle speed, the current vehicle control level, and the target vehicle control level, the obtaining the first vehicle control level comprising:
in response to that the current vehicle speed is greater than the target vehicle speed, selecting the current vehicle control level as the first vehicle control level; and
controlling the vehicle to run according to the first vehicle control level.

18. The medium according to claim 17, wherein the obtaining a first vehicle control level according to the current vehicle speed, the target vehicle speed, the current vehicle control level, and the target vehicle control level comprises:
determining whether the current vehicle speed is greater than the target vehicle speed; and
in response to that the current vehicle speed is not greater than the target vehicle speed, obtaining the first vehicle control level according to the current vehicle control level and the target vehicle control level, the first vehicle control level being not greater than the target vehicle control level and the current vehicle control level.

19. The medium according to claim 18, wherein the obtaining the first vehicle control level according to the current vehicle control level and the target vehicle control level comprises:
determining whether the current vehicle control level is greater than the target vehicle control level; and
in response to that the current vehicle control level is greater than the target vehicle control level, selecting a vehicle control level that is not greater than the target vehicle control level as the first vehicle control level; or
in response to that the current vehicle control level is not greater than the target vehicle control level, selecting the current vehicle control level as the first vehicle control level.

20. The medium according to claim 19, wherein a vehicle control level is indicative of and positively correlated with a deceleration of the vehicle.

* * * * *